J. HIGGINBOTTOM.
APPARATUS FOR SEPARATING AND PURIFYING WHEAT AND OTHER CEREALS AND THEIR PRODUCTS.
APPLICATION FILED SEPT. 14, 1920.
1,404,716.
Patented Jan. 24, 1922.
3 SHEETS—SHEET 1.
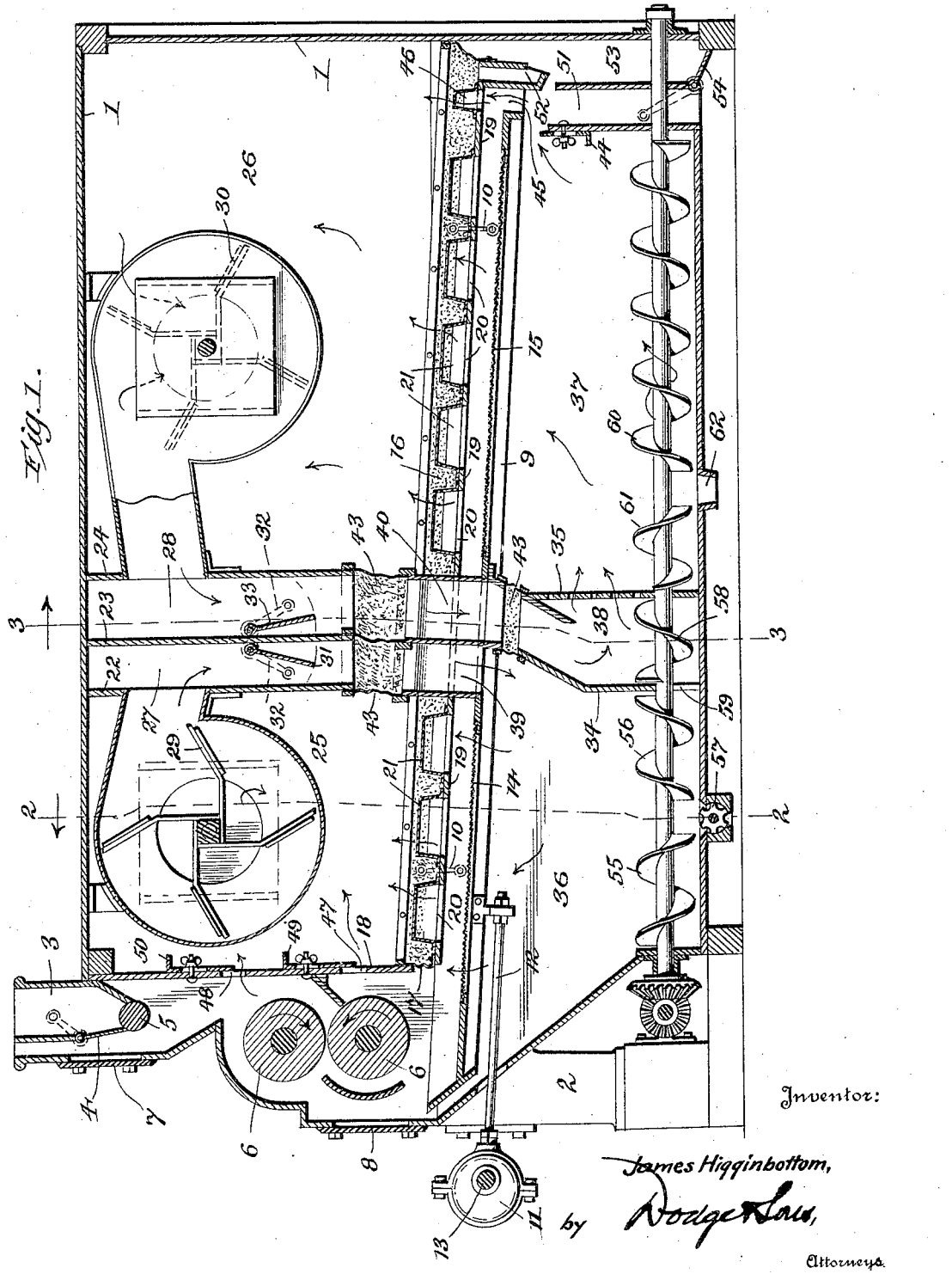
Inventor:
James Higginbottom,
by Dodge Son,
Attorneys

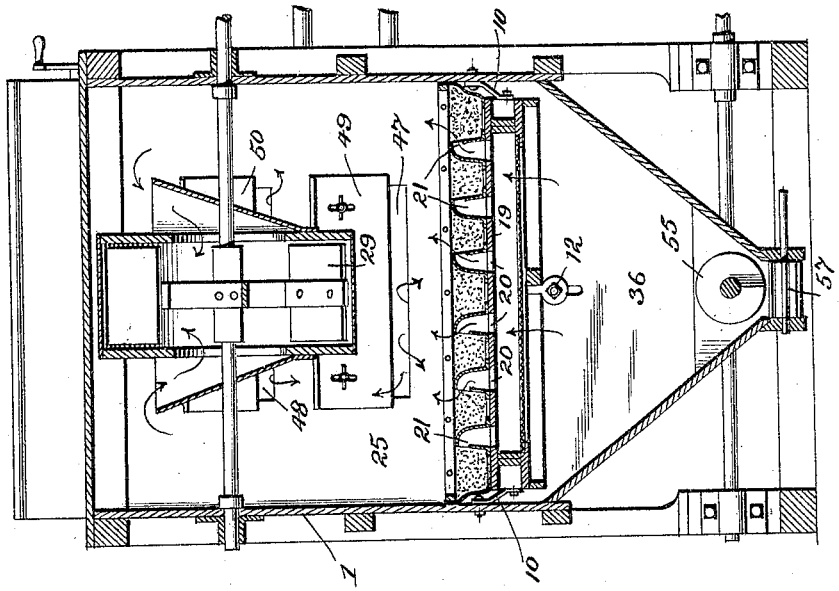
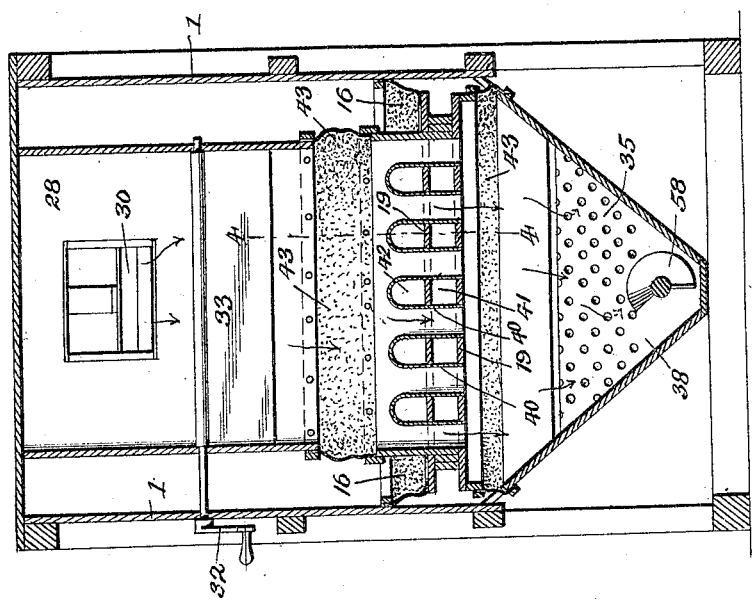

J. HIGGINBOTTOM.
APPARATUS FOR SEPARATING AND PURIFYING WHEAT AND OTHER CEREALS AND THEIR PRODUCTS.
APPLICATION FILED SEPT. 14, 1920.
1,404,716.
Patented Jan. 24, 1922.
3 SHEETS—SHEET 3.
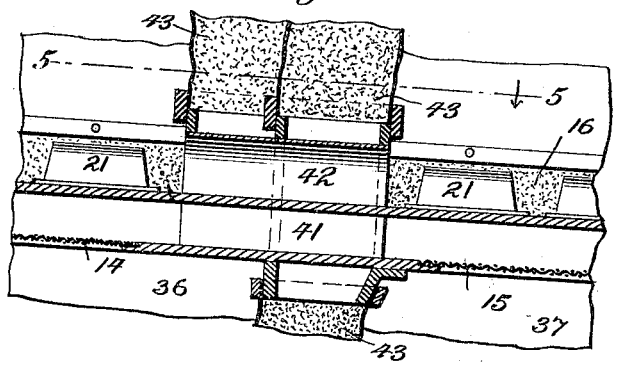
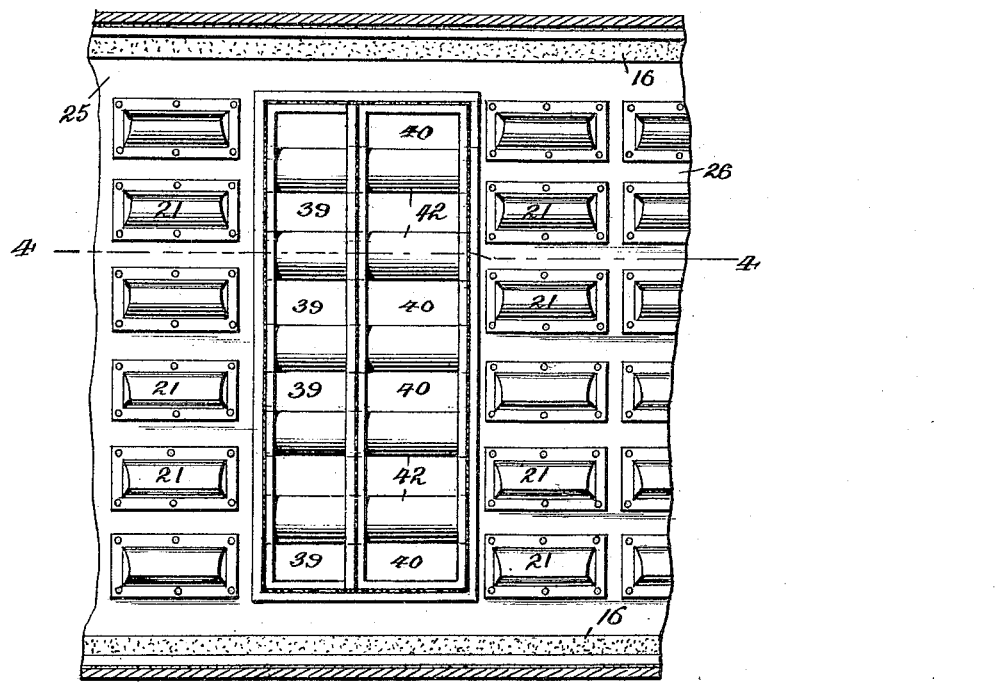
Inventor:
James Higginbottom,
By Dodge&Sons,
Attorneys.

UNITED STATES PATENT OFFICE.

JAMES HIGGINBOTTOM, OF LIVERPOOL, ENGLAND.

APPARATUS FOR SEPARATING AND PURIFYING WHEAT AND OTHER CEREALS AND THEIR PRODUCTS.

1,404,716.

Specification of Letters Patent. Patented Jan. 24, 1922.

Application filed September 14, 1920. Serial No. 410,327.

*To all whom it may concern:*

Be it known that I, JAMES HIGGINBOTTOM, a citizen of England, a subject of the King of Great Britain, residing at Liverpool, in the county of Lancaster, England, have invented certain new and useful Improvements in Apparatus for Separating and Purifying Wheat and other Cereals and Their Products (for which I have filed an application in England, Oct. 10, 1918, No. 16,477/18; England, April 9, 1919, No. 8961/19; France, Sept. 21, 1920, Ser. No. 134,063, and Germany, Sept. 10, 1920, Ser. No. H. 82368,) of which the following is a specification.

This invention relates to apparatus for separating and purifying wheat, cereals, and their products.

The object of the invention is to subject the material one or more times to the action of air currents flowing upwards through sieves, the air currents serving to carry away certain lighter materials and thereafter deposit them in collecting chambers from which they are discharged from the machine.

Important features of the invention are:

The confining of all air currents to closed circuits within the machine, the provision within a single machine of a plurality of chambers in which successive treatments of the same or of slightly different characters may be carried out; and finally, the subjection of the overtails to an aspirating air current at the moment of discharge from the sieve. Other features of novelty reside in the specific construction of the mechanism, and will be fully understood from the description of a preferred embodiment of the invention illustrated in the accompanying drawings, in which:

Figure 1 is a longitudinal section of the complete machine showing it arranged for two treatments;

Fig. 2 is a section on the line 2—2 of Fig. 1;

Fig. 3 is a section on the line 3—3 of Fig. 1;

Fig. 4 is an enlarged sectional view on the line 4—4 of Figs. 3 and 5; and

Fig. 5 is a section on the line 5—5 of Fig. 4.

The framework and casing of the apparatus are illustrated at 1, and the framework of the roller mill attached thereto is illustrated generally at 2. This roller mill is provided with a feed hopper 3, feed valve 4, feed roll 5, and breaking or reducing rolls 6. The doors 7 and 8 permit examination of the material as it goes to and from the rolls 6.

Mounted within the casing 1 is an inclined frame 9 supported by the pivoted links or suspenders 10 so as to be capable of a longitudinal reciprocating motion. This motion is imparted to the frame by means of an eccentric 11 and rod 12. The eccentric 11 is mounted on a shaft 13 which is rotated by any suitable means. The frame 9 is provided with a gauze sieve 14 at its head end and a second gauze sieve 15 at its tail end, and said frame 9 is connected to the walls of casing 1 by loose strips of canvas or other suitable fabric 16. This fabric strip extends down both sides and across the tail end of the frame 9, and a similar strip 17 connects the head end of said frame with a vertical partition 18 which isolates the rolls 6 from the interior of the casing 1. The frame 9 with its sieves thus serves to divide the interior of casing 1 substantially horizontally into an upper and a lower part.

Mounted on the frame 9 above the sieves 14 and 15 is a partition or diaphragm 19 formed with a plurality of elongated apertures 20, each aperture 20 being covered by an upstanding nozzle 21 whose form is clearly shown in Figs. 1 and 2.

The space within the casing 1 above the vibrating sieve frame 9 is divided by three partitions 22, 23 and 24 into an upper head compartment 25 and an upper tail compartment 26, and two ducts or passages 27 and 28. A rotary fan 29 is mounted in the upper head compartment 25, and operates to withdraw air from said compartment and discharge it into the duct 27. A similar fan 30 mounted in the upper tail compartment 26 operates to withdraw air from this compartment and discharge it into the duct 28. The flow of air in the duct 27 is regulated partly by regulating the speed of the fan 29 and partly by adjusting a valve 31, which valve may be set by a handle 32 or any equivalent means. Similarly, the flow of air through the duct 28 is regulated by regulating the speed of the fan 30 and also by the setting of a valve 33 which may be adjusted by a similar handle 32.

The space below the sieve frame 9 is divided by a partition 34 and a perforated partition 35 into a lower head compartment 36, a lower tail compartment 37, and a dust-collecting chamber 38. The air flowing through the duct 27 is discharged into the lower head compartment 36 through a series of spaced passages 39, and similarly the air flowing through duct 28 discharges into the dust-collecting chamber 38 through a series of spaced passages 40. The passages 39 and 40 pass through the sieves vertically between a series of intercalated horizontal passages 41 and 42 (see Figs. 3, 4 and 5). The horizontal passages 41 have their bottoms flush with the sieve areas 14 and 15, and allow material to flow from the tail end of sieve 14 to the head end of sieve 15 without serious interference. Similarly, the passages 42 have their lower sides flush with the diaphragm 19, and hence permit material to flow along said diaphragm between the nozzles 21 without series obstruction by the walls of the passages 39 and 40. The walls of the passages 39 and 40 are connected to the partitions 22, 23, 24, 34 and 35 by flexible strips of canvas or the like, indicated by the numeral 43. These strips 43 permit the necessary reciprocation of the frame 9 with reference to these partitions, and at the same time preclude undesired flow of air between the various passages and compartments.

It will be observed that air entering the dust-collecting chamber 38 flows through the apertures in the partition 35 to the lower tail compartment 37.

The circulation of air can now be traced as follows: The fan 29 draws air from the upper head compartment 25 and discharges it through the ducts or passages 27 and 39 into the lower head compartment 36, whence it flows upward through the sieve 14, apertures 20 and nozzles 21 to the upper head compartment 25, completing the circuit at the head end of the machine. Similarly, air is drawn from the upper tail compartment 26 by the fan 30, flowing thence through the ducts 28 and 40 to the dust-collecting chamber 38 in which its dust is deposited. The air then flows through the partition 35 into the lower tail compartment 37, thence upward through the sieve 15, apertures 20 and nozzles 21 to the upper tail compartment 26, thus completing the circuit.

It will be observed, however, that a portion of the air leaving the compartment 37 flows over an adjustable gate 44 and upward through an aperture 45, through which the overtails flow from the tail end of the sieve 15. This air passes thence upward through a nozzle 46, and is discharged into the upper tail compartment 26.

I also prefer to provide apertures 47 and 48, controlled respectively by adjustable gates 49 and 50. These are designed to permit a limited amount of the circulating air flowing from the lower head compartment 36 to pass around the rolls 6 for the purpose of regulating their temperature, and for the further purpose of extracting some moisture from the material being treated by the rolls.

The overtails flowing from the lower end of the sieve 15 are discharged from the machine through the passage 51. The air extractions flowing down from the diaphragm 19 are discharged through the spout 52 into a hopper 53 whence they leave the machine through a valve or gate 54. Material deposited in the lower head compartment 36 by the air current is fed by the reversely arranged screw conveyors 55 and 56 to a revolving fluted gate or roll 57, which discharges them from compartment 36 without permitting any escape of air. Dust deposited in the chamber 38 is similarly fed by a screw conveyor 58 through an aperture 59 provided in partition 34 for that purpose, to the conveyor 56 which feeds this material to the discharge roll 57. Material deposited in the lower tail compartment 37 is fed by the reversely arranged screw conveyors 60 and 61 to the aperture 62 through which it is discharged from the machine.

The gauze of the sieve 14 is of such mesh that the air current flowing upward therethrough will prevent material passing over the sieve from falling through into lower compartment 36. The gauze of the sieve 15, however, is of such mesh that the air current flowing upward therethrough will permit the purified material to fall through the mesh into the lower compartment 37.

With the parts arranged as above described the action of the apparatus is as follows: Material leaving the rolls 6 flows down over the sieve 14 and is there subjected to the purifying action of the upward air current. The heavier particles are not removed from the sieve by the air current and hence flow completely over the sieve, and in a partially purified condition reach the head of the sieve 15. The air current flowing up through the sieve 14 carries away two classes of material, one heavier than the other. The first class is known as the heavy extractions, which are deposited above the diaphragm 19 as soon as the air current becomes relatively quiescent in the upper head compartment 25. Backward flow of these deposited particles is precluded by the nozzles 21. The second class consists of the finer and lighter particles which will not be deposited in the compartment 25, but will flow with the air current through the fan 29 and ducts or passages 27 and 39 to the lower head compartment 36, where they will be deposited and discharged by the conveyors 55 and 56 and the revolving roll 57.

We now return to the material which has flowed down the length of the sieve 14 to the head end of the sieve 15. This material as it flows over the sieve 15 is subjected to a second purifying action, the air currents taking off certain light particles and carrying them through the apertures 20 and nozzles 21 into the relatively large upper tail compartment 26 where they settle out above the diaphragm 19. Here also the function of the nozzles 21 is to prevent the return of these particles to the sieve. Certain particles still lighter than those deposited in compartment 26 pass with the air current through the fan 30, and travel thence through the ducts or passages 28 and 40 to the dust-collecting chamber 38 where they are deposited and discharged by the conveyor 58, conveyor 56, and grooved roll 57. The air thus relieved of the fine particles flows through the perforated partition 35 to the lower tail compartment 37.

As already stated the meshes of the sieve 15 are sufficiently large to permit the heavy purified particles to pass, and these collect in the lower tail compartment 37, whence they are discharged by the conveyors 60 and 61 through the spout 62. The overtails leaving the end of the sieve 15 fall through an air current which flows over the adjustable gate 44, and hence are subjected to a final purifying action prior to their discharge from the machine.

Obviously various changes may be made in the specific arrangement of the apparatus, and such changes are contemplated by me. I wish particularly to state that the method of feeding material to the head end of the sieve frame 9 is subject to wide variation, and any feeding means known in the art may be used though I prefer the roller mill 6, 6, above described. The essential thing so far as the purification of material is concerned is that it be properly distributed over the entire width of the first sieve as it is fed thereto.

What I claim is:

1. A separating machine of the character described comprising a casing; a substantially horizontal sieve frame clothed with screening material and provided with a raised diaphragm whereby the casing is divided into upper and lower compartments; means for reciprocating the sieve frame longitudinally; transverse partitions dividing the upper and lower compartments into head and tail sections; an encased fan in the upper head compartment; and an encased fan in the upper tail compartment, each having a receiving eye opening into the compartment in which it is located; ducts connecting the outlets of the fans with the lower compartments; flexible material connecting the walls of the casing with the sieve frame and diaphragm; and flexible connections between the portions of the ducts connected with and passing through the sieve frame, sieves and diaphragm and the portions above and below the sieve frame.

2. A separating machine of the character described provided with a feeding mechanism and divided into upper and lower compartments by a substantially horizontal sieve frame carrying screen clothing, and a diaphragm above and substantially parallel with the screen clothing, said diaphragm being provided with openings; raised nozzles covering said openings but provided with lateral outlets; transverse partitions dividing the upper and lower compartments into head and tail sections; air-propelling devices mounted in casings in the upper compartments, adapted to receive air from said upper compartments and communicating by ducts with the lower compartments; flexible connections between the portions of the ducts passing through the sieve frame and sieves and the portions of said ducts above and below said sieve frame; means for imparting a longitudinally reciprocating movement to the sieve frame; and discharge devices for delivering material from the several lower compartments to the outside of the casing, the head and tail sections communicating by separated passages extending through the ducts in the direction of the length of the sieve frame, whereby air is drawn from the upper compartments, passed downward through the sieve frame to the lower compartments, and caused to ascend through the sieves and pass back to the air-propelling devices, thereby lifting up and carrying away to one of the discharge outlets lighter materials lifted from the sieves.

3. In a separating machine of the character described, the combination with a casing of a substantially horizontal sieve frame provided with gauze or screen material dividing the casing into upper and lower compartments; a partition or diaphragm carried by said frame somewhat above the screen material, said diaphragm being provided with openings; nozzles located above and encompassing said openings, open at bottom, closed at top and provided with side openings, whereby air is permitted to pass upward through the sieves and through the nozzles but material is prevented from passing from the upper to the lower compartments; means for imparting a longitudinally reciprocating movement to the sieve frame; and impervious flexible material connecting the sieve frame and its diaphragm with the walls of the casing, whereby air is prevented from passing from the lower to the upper compartment except through the sieves and nozzles, and material is prevented from passing from above the diaphragm downward.

4. The combination of a casing divided by transverse partitions into two compartments substantially isolated from each other; an inclined sieve in the first compartment having a mesh too fine to pass the material through the sieve, and an inclined sieve in the second compartment having a larger mesh, the transverse partitions and the sieves extending from side wall to side wall of the casing; means for vibrating the sieves; means for feeding material to the head end of the first sieve and from the tail end of the first sieve to the head end of the second sieve; means to receive the overtails from the second sieve; a fan for circulating air in the first compartment in an upward direction through the first sieve; a second fan for circulating air in the second compartment in an upward direction through the second sieve, and simultaneously in an upward direction through the overtails flowing from the tail end of the second sieve, said fans having both intake and outlet arranged wholly within the casing, whereby a closed circulation is effected; mechanism serving to discharge the air extractions from the machine; and means serving to receive the purified material falling through the second sieve against the air current.

5. The combination of a casing divided by transverse partitions into two compartments substantially isolated from each other; an inclined sieve in the first compartment having a mesh too fine to pass the material through the sieve, and an inclined sieve in the second compartment having a larger mesh, the transverse partitions and the sieves extending from side wall to side wall of the casing; means for vibrating the sieves; means for feeding material to the head end of the first sieve and from the tail end of the first sieve to the head end of the second sieve; means to receive the overtails from the second sieve; a fan for circulating air in the first compartment in an upward direction through the first sieve; a second fan for circulating air in the second compartment in an upward direction through the second sieve, and simultaneously in an upward direction through the overtails flowing from the tail end of the second sieve, said fans having both intake and outlet arranged wholly within the casing, whereby a closed circulation is effected; individual means for regulating the flow of air in the compartments; mechanism serving to discharge the air extractions from the machine; and means serving to receive the purified material falling through the second sieve against the air current.

6. The combination of a casing divided by transverse partitions into two compartments substantially isolated from each other; an inclined sieve in the first compartment having a mesh too fine to pass the material through the sieve, and an inclined sieve in the second compartment having a larger mesh, the transverse partitions and the sieves extending from side wall to side wall of the casing; means for vibrating the sieves; means for feeding material to the head end of the first sieve and from the tail end of the first sieve to the head end of the second sieve; means to receive the overtails from the second sieve; a fan for circulating air in the first compartment in an upward direction through the first sieve; a second fan for circulating air in the second compartment in an upward direction through the second sieve, and simultaneously in an upward direction through the overtails flowing from the tail end of the second sieve, said fans having both intake and outlet arranged wholly within the casing, whereby a closed circulation is effected; individually operable valves for regulating the circulation of air in the compartments; discharge mechanism serving to discharge the heavy air extractions from the machine; discharge mechanism serving to discharge the light air extractions from the machine; and means serving to receive the purified material falling through the second sieve against the air current.

In testimony whereof I have signed my name to this specification.

JAMES HIGGINBOTTOM.